United States Patent [19]

Pritchett

[11] 4,270,626
[45] Jun. 2, 1981

[54] COUPLING MEANS FOR HORIZONTAL VIBRATOR

[75] Inventor: William C. Pritchett, Plano, Tex.

[73] Assignee: Atlantic Richfield Company, Los Angeles, Calif.

[21] Appl. No.: 108,206

[22] Filed: Dec. 28, 1979

[51] Int. Cl.³ .................................................. G01V 1/047
[52] U.S. Cl. ................................... 181/113; 181/116; 181/119; 181/401; 367/75; 248/678
[58] Field of Search ............... 367/75; 181/117, 116, 181/119, 121, 401, 113; 248/545, 677, 678; 172/40

[56] References Cited

U.S. PATENT DOCUMENTS

| | | | |
|---|---|---|---|
| 2,557,960 | 6/1951 | Gerhardt | 89/37 L |
| 3,046,843 | 7/1962 | Rowe | 248/678 |
| 3,159,232 | 12/1964 | Fair | 181/401 |
| 3,159,233 | 12/1964 | Clynch et al. | 181/119 |
| 4,135,599 | 1/1979 | Fair | 181/121 |
| 4,143,736 | 3/1979 | Fair | 367/75 |

Primary Examiner—Howard A. Birmiel
Attorney, Agent, or Firm—Robert M. Betz

[57] ABSTRACT

The present invention relates to means for coupling the horizontally directed force of a seismic transducer into the earth with a downward going shear wave. The coupling means consists of a plurality of downwardly convergent wedge-shaped earth engaging cleats of differing depth mounted on the transducer support means. The lateral load-bearing surfaces of the cleats have sloping faces equally inclined to the vertical, so that they tend to compact and compress the earth to a similar degree with horizontal vibrator motion. However, on some or all of the cleats these sloping faces are interrupted by horizontal faces in a stair-case fashion so as to vary the overall sharpness of such cleats.

6 Claims, 5 Drawing Figures

COUPLING MEANS FOR HORIZONTAL VIBRATOR

BACKGROUND OF THE INVENTION

1. Field of the Invention

This invention generally relates to transducers for inducing vibratory signals in an elastic medium such as the earth and more particularly, to an improved means for coupling the horizontally directed force of a seismic transducer into the earth.

2. Description of the Prior Art

In Applicant's prior application Ser. No. 83,070 entitled Coupling Means for Horizontal Vibrator, there is disclosed means for coupling the horizontally directed force of a seismic transducer into the earth consisting of the plurality of downwardly convergent wedge-shaped, earth-engaging cleats mounted on the transducer support. It is provided therein that the cleats are of differing depths. Also, as described in the application the convergent lateral faces of the shallower cleats are preferably less steeply sloped than those of the deeper ones. This construction permits initial penetration of hard surfaces more readily, yet prevents subsequent "bottoming out".

With horizontal movement of the vibrator the earth will be displaced and hence stressed and compacted to a greater extent against the more steeply sloping faces of the cleats described in this prior application so that in consequence the less steeply sloping faces will be less effective in pushing against the earth. This is preferable in terrain where the earth materials increase in competence with depth since the stress in the earth increases with the earth's ability to withstand such stress without tearing. The inventor has recognized, however, that in other types of terrain it may be desirable to equalize these impacting forces among the cleats while retaining other advantages of variations in depth and sharpness.

It is therefore a general object of this invention to provide an improved means of coupling the horizontally directed force of a transducer into an elastic medium such as the earth.

It is a further object of this invention to provide means for coupling the horizontally directed force of transducer into the earth wherein such force is applied with maximum efficiency to earth materials varying widely in competency.

It is yet another object of this invention to provide means for coupling the horizontally directed force of a transducer into the earth which is adapted to prevent premature decoupling or "bottoming out" of the transducer.

Other and further objects and advantages of the invention will become apparent upon consideration of the following detailed description and drawings.

In summary, in accordance with the preferred embodiment of the present invention, means are provided for coupling the energy of a horizontal vibrator into the earth comprising a plurality of downwardly convergent earth-engaging cleats dependently supported from said transducer. The cleats are in the form of inverted wedges of varying depth arranged in rows extending transversely to the direction of transducer motion, each cleat having a pair of lateral load-bearing faces converging to form a horizontal cleat edge aligned with the direction of such rows, and a pair of opposed end faces normal to the horizontal plane of such edges. The lateral cleat surfaces, with the exception of those of the deepest cleats, consist of interspersed sloping and horizontal faces, and the sloping faces of the lateral surfaces of all of the cleats including the deepest ones, are equally inclined to the vertical. Because of this staircase contour, in composite effect the shallower cleats behave as though they were more blunt. In an alternate embodiment, the lateral faces of the deepest cleats also have a staircaselike configuration.

DETAILED DESCRIPTION OF THE PREFERRED EMBODIMENTS

Figure 1:
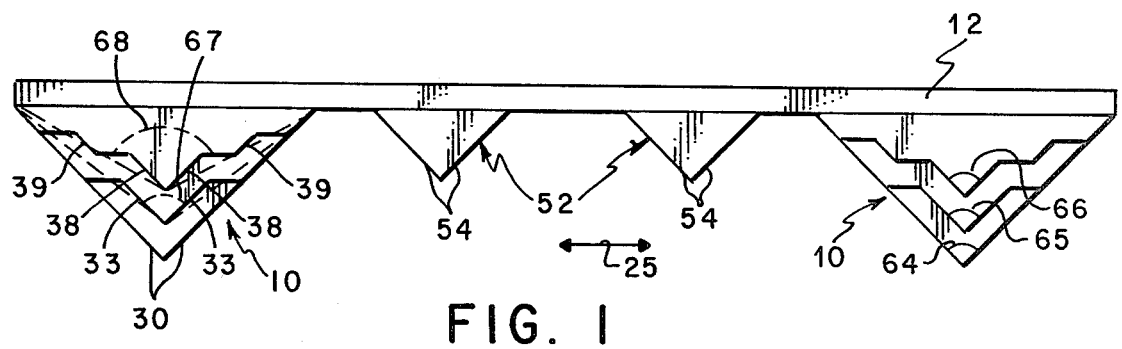
FIG. 1 represents in semi-diagrammatic form an end elevational view of a transducer earth coupling means in accordance with the preferred embodiment of this invention.
Figure 2:
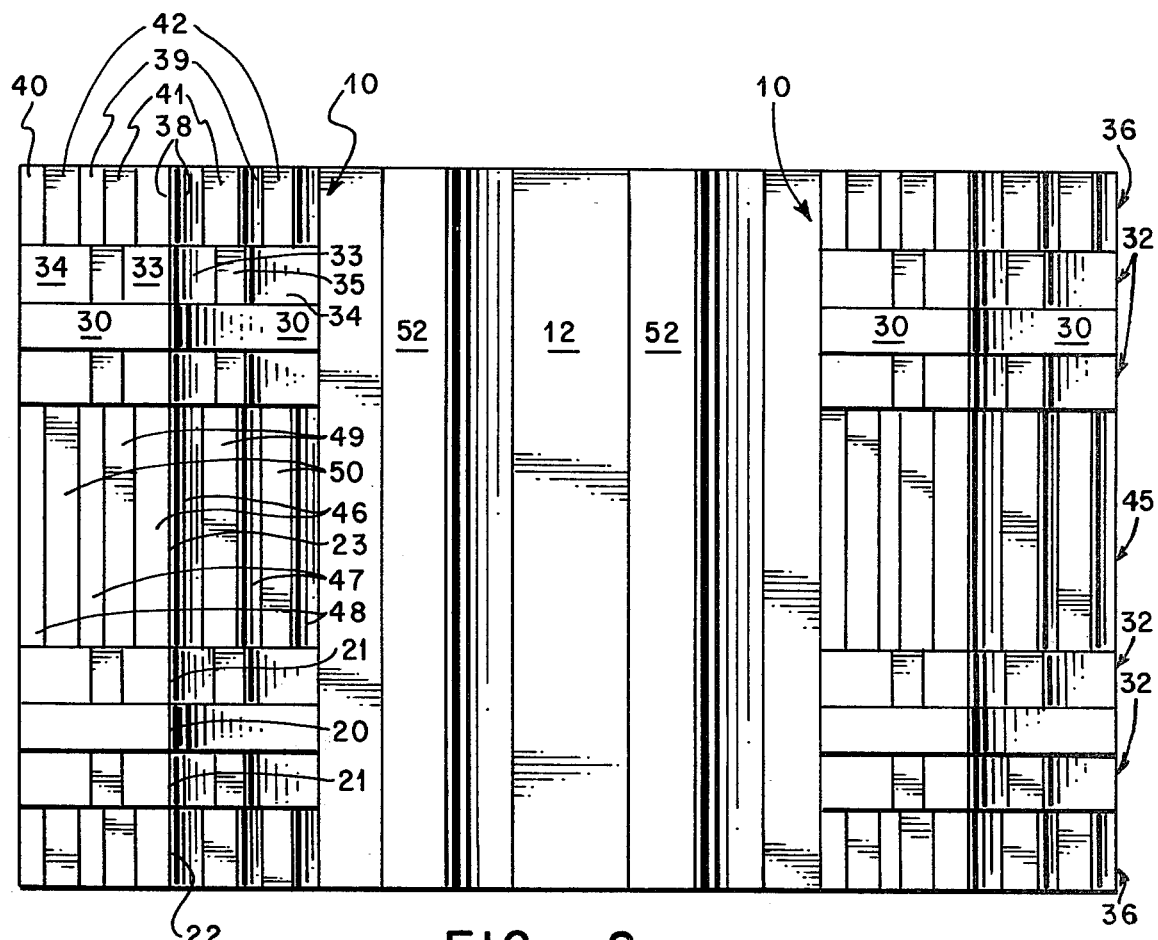
FIG. 2 represents in semi-diagrammatic form a bottom plan view of the transducer earth coupling means of FIG. 1.
Figure 3:
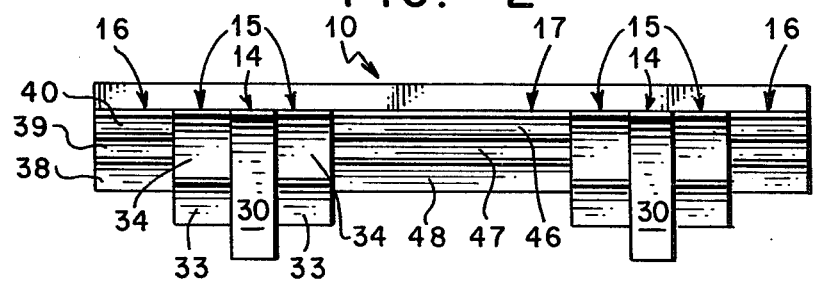
FIG. 3 represents in semi-diagrammatic form a side elevational view of the transducer earth coupling means of FIG. 1.

With reference now to the drawings, in particular the FIGS. 1, 2 and 3, coupling means for a horizontal shear wave transducer are depicted generally in accordance with a preferred embodiment of this invention. A pair of rows of cleats, either of which is generally indicated by a reference numeral 10 are dependently supported in any convenient manner from support means such as base plate 12 for a horizontal vibrator (not shown). Each row of cleats 10 consists of a plurality of individual inverted wedge-shaped cleats of differing depth and configuration. In what follows the same reference numeral is assigned to all cleats of identical configuration and to the identical components or features thereof, regardless of the location of such cleats along either of rows 10. Individual cleats may be given structural rigidity by means of spaced apart internal reinforcing plates (not shown) as is well known in this art. Although the number of the variations in depth, edge length and sharpness in the cleats in row 10 is not critical for this invention, for illustrative purposes four different configurations of such cleats have been shown in FIG. 1.

It will be seen most readily in FIG. 3 that each row 10 includes a pair of spaced apart cleats 14 of greatest depth, four cleats 15 of intermediate depth disposed respectively on opposite sides of cleats 14, two cleats 16 of least depth at opposite ends of row 10 and a single cleat 17, also of least depth in the center of row 10. Each of cleats 14–17 includes two vertical and parallel end plates and two converging lateral load-bearing surfaces which join to form a bottom cleat edge.

As best seen in FIG. 2, the edges of cleats 14–17 are indicated respectively by reference numerals 20, 21, 22 and 23. Edges 20–23 are in alignment and extend transversely to the direction of the horizontal force to be applied by the transducer, shown in FIG. 1 by the arrows indicated by the reference numeral 25.

As best seen in FIGS. 1 and 2, edges 20 of cleats 14 are formed by the junction of pairs of convergent lateral load-bearing surfaces 30 which are rectangular and planar in shape. Pairs of lateral load-bearing surfaces 32 converge to form edges 21 of cleats 15. Each surface 32 consists of two sloping faces 33 and 34 and an intermediate horizontal face 35 in a zig-zag or stair-case pattern. Pairs of load-bearing lateral surfaces 36 converged respectively to form edges 22 of cleats 16 at the opposite ends of row 10, each surface 36 comprising spaced apart sloping faces 38, 39 and 40 and intermediate horizontal faces 41 and 42. Finally, edge 23 of center cleat 17 is formed by the juncture of convergent lateral load-bearing surfaces 45, each of which comprises spaced apart sloping faces 46, 47 and 48 and intermediate horizontal faces 49 and 50.

Figure 4:
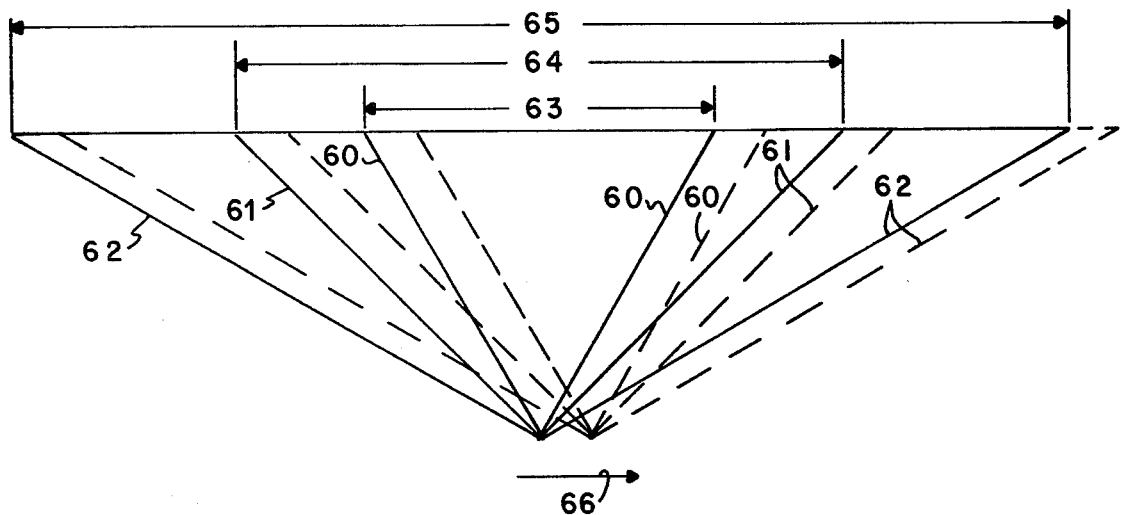
FIG. 4 represents diagrammatically the variation in earth displacement produced by earth coupling cleat means for any given horizontal transducer with variation in slope of the load-bearing surfaces of such cleat means.

It is apparent from the drawings that the abovedescribed sloping faces of cleats 14–17 are all equally inclined to the vertical. The purpose of maintaining such equal slopes is best understood by reference to FIG. 4, which illustrates how earth displacement and stress varies in a device of the general character described with variation in the slope of the load-bearing lateral faces of an earth-coupling cleat. Suppose hypothetically that the lines indicated by the reference numerals 60, 61 and 62 represent variously sloped lateral load-bearing faces of wedge-shaped earth coupling cleats convergent downwardly from bases of dimensions indicated respectively by the reference numerals 63, 64 and 65. Horizontal motion of the cleats along the direction indicated by the arrow 66 will displace sloping faces 60, 61 and 62 to the right so that they assume the dotted positions as shown. It is apparent that horizontal movement of this system relative to the earth results in most earth displacement by the more steeply sloping face 60, less by the immediate slope face 61 and least by flattest face 62. For this reason the earth will be stressed and compacted more against a more steeply sloping cleat face. As a consequence if cleats having lateral load-bearing faces of differing slopes are incorporated in the same earth coupling apparatus the blunter or flatter cleats will be less effective in pushing against the earth. This effect is accentuated by any upward movement of the system as a whole that may be induced by the force against the more steeply sloping faces. As will be explained, with the use of cleats designed in accordance with FIGS. 1, 2 and 3, the effect of employing such differing slopes on the load-bearing faces is eliminated while the advantages of employing cleats of differing depth is preserved. If desired, in extremely loose soils, the space between rows 10 may accomodate inner cleats 52 whose lateral load-bearing surfaces 54 are preferably sloped to match that of the other sloping cleat surfaces.

In operation the full weight of the transducer is first exerted on the surfaces 30 of deeper cleats 14 unless and until sufficient penetration is achieved to bring the remaining cleats into operation. As penetration increases, surfaces 32 of cleats 15 will come into play. Still further penetration during a long sweep will allow load-bearing surfaces 36 and 45 of cleats 16 and 17 to be pressed against the earth. As cleats 15, 16 and 17 come successively into play, their horizontal faces 35, 41, 42, 49 and 50 serve to compact the earth and compress it so that it can withstand a higher horizontal force applied by the adjacent sloping faces. These horizontal faces also serve to make these cleats effectively blunter so as to limit ultimate penetration and bottoming out of the transducer in loose soils. At the same time since sloping faces 33, 34, 38, 39, 40, 46, 47 and 48 are all inclined equally with face 30, the earth is stressed equally against all such faces with horizontal transducer movement. Thus all cleats 14–17 are equally effective in transmitting horizontal force to the surrounding earth. The net result of this design is that the beneficial effect of applying cleats of differing degrees of depth and sharpness is retained. Yet where in a long sweep earth of substantially equal competency is encountered by all cleats the efficiency of horizontal force transmission is maximized.

As an example of cleat construction in accordance with the preferred embodiment of this invention as shown in FIGS. 1, 2 and 3, cleats 14–17 may all be given inner edge angles 64, 65 and 66 of 90°. Yet the effect of the "stair-case" construction is to develop an effective composite interior cleat angle 67 for cleat 15 of about 105° and for cleat 16 and 17 an interior angle 68 of about 123°. In this way, cleats 14–17 behave as though they are of progressively less sharpness so as to preserve the overall advantage of employing cleats of differing depth, i.e., a good initial hard surface penetration without tendency to "bottom out" in loose soils.

Figure 5:
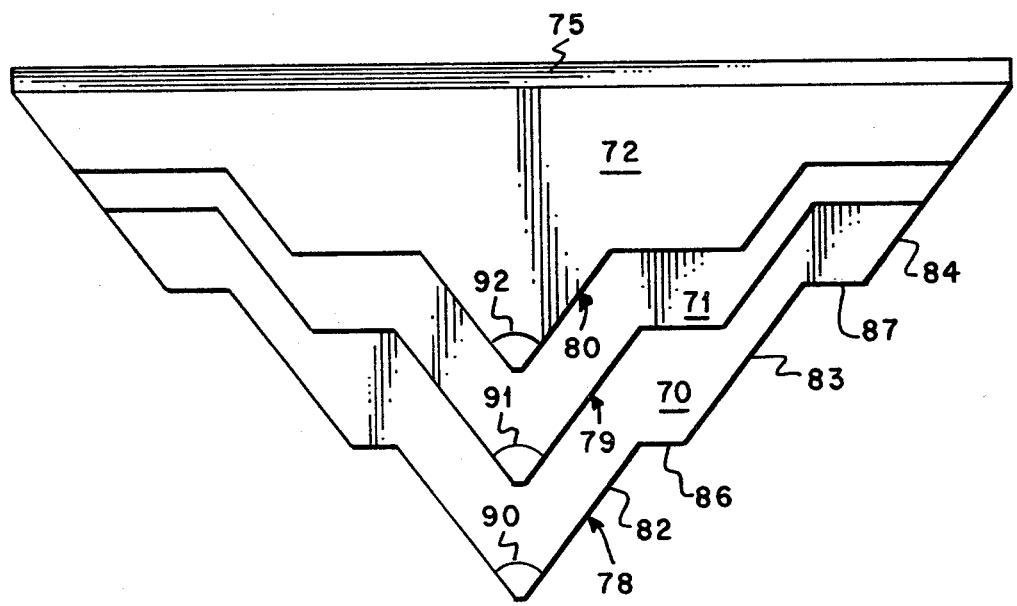
FIG. 5 represents in semi-diagrammatic form an end elevational view in detail of a plurality of cleat means of a transducer earth coupling means in accordance with an alternate embodiment of this invention.

An alternate embodiment of the invention is depicted in FIG. 5 which is an enlarged detail of several earth coupling cleats of differing depth. In the drawing cleats 70, 71 and 72 extend to successively decreasing depths beneath base plate 75. In this embodiment the corresponding lateral load-bearing surfaces for cleats 70, 71 and 72 are generally designated by general reference numerals 78, 79 and 80. As distinguished from the embodiment of FIGS. 1, 2 and 3 load-bearing surface 78 is not planar but, like surfaces 79 and 80 has an inverted staircase shape consisting of sloping faces 82, 83 and 84 with intervening horizontal faces 86 and 87. In this embodiment, as previously described, all sloping faces of all cleats are inclined to the vertical to the same degree. However, unlike the previous embodiment, horizontal faces 86 and 87 on surface 78 also assist in earth compaction with sufficient penetration of the deepest cleat 72.

In the alternate embodiment of FIG. 5, cleats 70–72 may typically be provided with interior edge angles 90, 91 and 92 respectively, of 75°. Yet effective composite cleat edge angles may easily be achieved in accordance with this invention of 90°, 122°, and 140° for cleat 70 72 respectively.

It should be understood that the particular embodiments of this invention described and illustrated are illustrative only and are not to be regarded as limiting. Consequently, many variations in the shape and construction of the various component parts of this invention will readily occur to those skilled in the art without departing from the scope of this invention as set forth in the appended claims.

What is claimed is:

1. In a transducer for inducing shear waves in an elastic medium including a horizontally movable support means adapted to couple the energy of a transducer into said medium, the improvement comprising a plurality of inverted, wedge-shaped cleat means depending from said support means for engaging the surface of said medium, each of said cleat means having a pair of lateral surfaces downwardly convergent from said support means to form a cleat edge adapted to extend horizontally and transversely to the direction of horizontal transducer motion, the lateral surfaces of at least some of said cleat means consisting of interspersed sloping and horizontal faces.

2. An apparatus as claimed in claim 1 wherein sloping faces are equally inclined to the vertical.

3. An apparatus as claimed in claim 2 wherein said cleat means are of differing depth.

4. In a transducer for inducing shear waves in an elastic medium including a planar support adapted to couple the horizontally directed energy thereof into said medium, the improvement comprising a plurality of inverted, wedge-shaped cleat means depending from said support means for engaging the surface of said medium, each of said cleat means having two parallel end plates adapted to extend perpendicular to the plane of said support means and two convergent lateral plates joined to form an earth-engaging cleat edge adapted to extend horizontally and transversely to the direction of horizontal transducer motion, said cleats being divided into at least two spaced-apart rows within each of which all of said cleat edges are in axial alignment extending normal to the direction of the energy applied by said transducer, said lateral plates of at least some of said cleat means consisting of interspersed sloping and horizontal faces, whereby the cleats in each said row vary in configuration from greater to lesser depth and effective sharpness.

5. Apparatus as claimed in claim 4 wherein the end plates of adjacent cleats in each said row are contiguous.

6. Apparatus as in claim 4 wherein each of said rows of cleats is formed as a unitary rigid structure.

* * * * *